3,398,142
3β-SUBSTITUTED-4-PREGNENES
David J. Marshall, Cote St. Luc, Quebec, Canada, assignor to American Home Products Corporation, New York, N.Y., a corporation of Delaware
No Drawing. Filed June 10, 1963, Ser. No. 286,475
Claims priority, application Canada, June 23, 1962, 852,294
3 Claims. (Cl. 260—239.55)

The present invention relates to 3β-substituted-4-pregnenes of the following general structural formula:

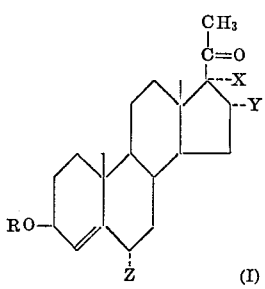

in which R is selected from the group consisting of hydrogen and lower acyl and X, Y, and Z are defined as follows:

(A) X represents a lower acyloxy when Y is hydrogen and Z is a radical selected from the group consisting of hydrogen, lower alkyl, and fluorine or (B) X represents a lower alkyl group when Y and Z are both hydrogen or (C) X and Y together represent a radical selected from the group consisting of lower alkylidenedioxy and lower aralkylidenedioxy and Z is hydrogen.

These compounds are useful progestational compounds possessing a high degree of activity when administered orally or by subcutaneous injection and are also of long duration of action. Furthermore, the compounds of the present invention are distinguished by being substantially free from undesirable side-effects such as, e.g., masculinizing properties. Some of these compounds possess the singular property of suppressing the action of pituary gonadotrophin. Surprisingly, some of the 3β-hydroxy-4-pregnenes of the present invention are more active as progestational agents than the corresponding Δ⁴-3-ketones.

As hereinbefore mentioned, the compounds of the present invention may be administered orally or by intramuscular injection. For administration by intramuscular injection, the compounds of the present invention are dissolved in a pharmaceutically acceptable solvent, for example, in a vegetable oil, preferably in dosages of from 1 to 50 mg. per dosage form. For oral administration, the compounds of the present invention may be formulated with pharmaceutically acceptable carriers, for example, lactose, starch, magnesium stearate, or the like, for instance, in the form of tablets or capsules, preferably in dosages containing from 5 to 50 mg. of the active ingredient per dosage form.

This invention also relates to a method for producing the hereinbefore referred to 3β-hydroxy-4-pregnenes which are produced by treating a correspondingly substituted progesterone with lithium aluminum tri-t-butoxyhydride or with sodium borohydride, with the new and unexpected result that the 3-keto group is smoothly reduced to a 3β-hydroxy group without concomitant reduction of the 20-keto group. This result is all the more surprising because it is well known that 20-keto groups are usually more readily reduced by hydrides than Δ⁴-3-keto groups The 3β-hydroxy group of these 4-pregnenes may be acylated in conventional manner to obtain the corresponding 3β-lower acyloxy-4-pregnenes.

The unusual and surprising course of this reaction depends upon the presence of a suitable substituent in position 17, or in both positions 16 and 17, which inhibits the reactivity of the 20-keto group towards the specific reducing agent, lithium aluminum tri-t-butoxyhydride or sodium borohydride. Preferred substituents are those selected from the group consisting of 17α-lower acyloxy, 17α-lower alkyl, 16α,17α-lower alkylidenedioxy, and 16α, 17α-lower aralkylidenedioxy.

The reduction of the suitably substituted progesterone is preferably carried out in solution in a solvent in which both the progesterone and the reducing agent are soluble. Such a solvent can be of the ether type. A preferred solvent for the reaction is tetrahydrofuran.

Other conditions of reaction will, of course, have an effect on the yield obtained and on the possible formation of undesirable by-products. The preferred conditions of reaction include the use of a molar excess of lithium aluminum tri-t-butoxyhydride or sodium borohydride, while stirring, at temperatures between 0° C. and 65° C. for several hours. Larger amounts of the hydride, or longer reaction times are required at lower temperatures. After completion of the reaction, the desired 3β-hydroxy-4-pregnene may be recovered in a conventional manner from the reaction mixture. When an excess of hydride has been used, this excess may be decomposed before recovery of the product.

The preferred 3β-hydroxy-4-pregnenes of the invention include:

3β-hydroxy-17α-acetoxy-4-pregnen-20-one
3β-hydroxy-6α-methyl-17α-acetoxy-4-pregnen-20-one
3β-hydroxy-6α-fluoro-17α-acetoxy-4-pregnen-20-one
3β-hydroxy - 16α,17α-isopropylidenedioxy-4-pregnen-20-one
3β,16α,17α-trihydroxy-4-pregnen-20-one acetophenonide, and
3β-hydroxy-17α-methyl-4-pregnen-20-one.

The following formulae and examples will illustrate this invention in preferred aspects.

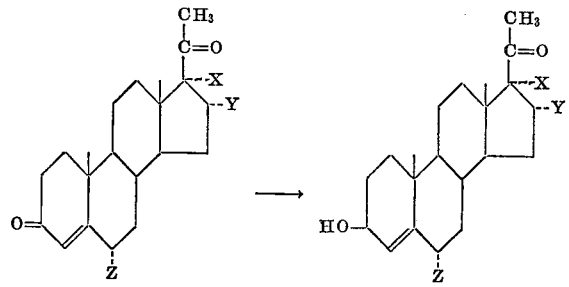

in which X, Y and Z are as defined hereinbefore.

EXAMPLE 1

3β-hydroxy-17α-acetoxy-4-pregnen-20-one

A solution of 0.30 g. of 17α-acetoxyprogesterone [Turner, J. Am. Chem. Soc., 75, 3489 (1953)] in 7 ml. of tetrahydrofuran was added dropwise with stirring to an ice-cooled solution of 0.82 g. of lithium aluminum tri-t-butoxyhydride in 3 ml. of tetrahydrofuran. After stirring for three hours in an ice bath, the mixture was hydrolysed with saturated Rochelle salt solution and filtered, and the filtrate was evaporated in vacuo. Crystallization of the residue from methanol-water gave 3β-hydroxy-17α-acetoxy-4-pregnen-20-one, M.P. 199–201.5° C.,

[α]$_D^{24}$+24.5° (in chloroform). The infrared spectrum showed the presence of hydroxyl and the 17α-acetoxy-20-ketone grouping, and the absence of Δ$^4$-3-ketone.

*Analysis.*—Calcd. for $C_{23}H_{34}O_4$: C, 73.75; H, 9.15. Found: C, 73.98; H, 9.39.

The corresponding 3,17-diacetate, obtained by acetylation with acetic anhydride in pyridine, was crystallized from aqueous methanol, M.P. 166–168.5° C., [α]$_D^{24}$+1.1° (in chloroform).

*Analysis.*—Calcd. for $C_{25}H_{36}O_5$: C, 72.09; H, 8.71. Found: C, 72.36; H, 8.74.

A sample of 17α-acetoxyprogesterone was added to an ice-cooled solution of sodium borohydride in dry methanol, and stirred for 1.5 hours. Two drops of acetic acid were added, and the mixture was evaporated to dryness. Extraction with chloroform, followed by evaporation of the solvent, yielded 3β-hydroxy-17α-acetoxy-4-pregnen-20-one.

EXAMPLE 2

3β-hydroxy-6α-methyl-17α-acetoxy-4-pregnen-20-one

A solution of 1.50 g. of 6α-methyl-17α-acetoxy-progesterone [Babcock et al., J. Am. Chem. Soc., 80, 2904 (1958)] in 39 ml. of tetrahydrofuran was added dropwise to 2.97 g. of lithium aluminum tri-t-butoxyhydride in 12 ml. of tetrahydrofuran. After stirring for three hours at room temperature, 12 ml. of acetone was added to decompose excess hydride and stirring was continued for an additional thirty minutes. Sufficient saturated sodium sulfate solution was then added to precipitate the inorganic salts, the mixture was filtered, and the filtrate was concentrated in vacuo. Ether extraction gave a crude product which was chromatographed on benzene on Florisil (a synthetic magnesium silicate). The material eluted with benzene containing 5% ether was crystallized from ether-hexane, yielding the 3β-hydroxy compound, M.P. 183–186° C., [α]$_D^{24}$+21° (in chloroform).

*Analysis.*—Calcd. for $C_{24}H_{36}O_4$: C, 74.57; H, 8.87. Found: C, 74.25; H, 9.22.

The diacetate, formed in the usual way, was crystallized from methanol, M.P. 165–167° C., [α]$_D^{24}$—13° (in chloroform).

*Analysis.*—Calcd. for $C_{26}H_{38}O_5$: C, 72.52; H, 8.90. Found: C, 72.26; H, 8.60.

EXAMPLE 3

3β-hydroxy-6α-fluoro-17α-acetoxy-4-pregnen-20-one

6α-fluoro-17α-acetoxyprogesterone [Bowers et al., J. Am. Chem. Soc., 81, 5991 (1959)] was reduced with lithium aluminum tri-t-butoxyhydride as described above for the corresponding 6-methyl compound. The crude product was crystallized from aqueous ethanol and then from acetone-hexane, M.P. 148–148.5° C. (dec.), [α]$_D^{24}$+27° (in chloroform).

*Analysis.*—Calcd. for $C_{23}H_{33}FO_4$: C, 70.39; H, 8.47. Found: C, 70.04; H, 8.24.

The diacetate melted at 207° C. (dec.), [α]$_D^{24}$—8.1°.

*Analysis.*—Calcd. for $C_{25}H_{35}FO_5$: C, 69.10; H, 8.12. Found: C, 69.01; H, 8.10.

EXAMPLE 4

3β-hydroxy-16α,17α-isopropylidenedioxy-4-pregnen-20-one

16α,17α-isopropylidenedioxyprogesterone [Cooley et al., J. Chem. Soc., 4373 (1955)] was reduced with lithium aluminum tri-t-butoxyhydride at 0° as described above for 17α-acetoxy-progesterone. The crude product was acetylated and the acetate was crystallized from methylene chloride-methanol, M.P. 196–197.5° C. [α]$_D^{24}$+43° (in chloroform).

*Analysis.*—Calcd. for $C_{26}H_{38}O_5$: C, 72.51; H, 8.89. Found: C, 72.81; H, 9.03.

A mixture of 0.42 g. of the acetate and 0.08 g. of potassium carbonate in 6 ml. of methanol and 0.6 ml. of water was heated for one hour under reflux; water was added, and the resulting solid was recrystallized from aqueous methanol. The 3β-hydroxy compound melted at 168–170° C. (sometimes resolidifying and remelting at 184–185° C.), [α]$_D^{24}$+85° (in chloroform).

*Analysis.*—Calcd. for $C_{24}H_{36}O_4$: C, 74.20; H, 9.34. Found: C, 73.94; H, 9.15.

16,17-isopropylidenedioxyprogesterone (200 mg., 0.52 millimole) was added to an ice-cooled solution of 39 mg. (1.04 millimoles) of sodium borohydride in 5 ml. of dry methanol. After stirring for 1.5 hours, 0.1 ml. of acetic acid was added, and the solution was taken to dryness. Extraction with chloroform gave a solid product which was identified as almost pure 3β-hydroxy-16α,17α-isopropylidenedioxy-4-pregnen-20-one by infrared spectrography and thin-layer chromatography.

EXAMPLE 5

3β,16α,17α-trihydroxy-4-pregnen-20-one acetophenonide

A solution of 1.00 g. of 16α,17α-dihydroxy-progesterone acetophenonide [Fried et al., Chem. and Ind., 465 (1961)] in 20 ml. of tetrahydrofuran was added to 1.70 g. of lithium aluminum tri-t-butoxyhydride in 8 ml. of tetrahydrofuran. After stirring for three hours at room temperature, sufficient saturated ammonium chloride was added to precipitate the inorganic salts, the mixture was filtered, and the filtrate was concentrated in vacuo. Ether extraction gave a gummy product which did not crystallize well. It was acetylated with acetic anhydride and pyridine, and the acetate was crystallized from methylene chloride-methanol, M.P. 166–168° C., [α]$_D^{24}$—12° (in chloroform).

*Analysis.*—Calcd. for $C_{31}H_{40}O_5$: C, 75.58; H, 8.19. Found: C, 75.50; H, 7.95.

A mixture of 0.48 g. of the acetate and 0.14 g. of potassium carbonate in 6.5 ml. of methanol and 0.6 ml. of water was heated for one hour under reflux, and the solution was diluted with water and extracted with ether. Crystallization from ether-hexane yielded 3β,16α,17α-trihydroxy-4-pregnen-20-one acetophenonide, M.P. 133–141° C., [α]$_D^{24}$+25° (in chloroform).

*Analysis.*—Calcd. for $C_{29}H_{38}O_4$: C, 77.29; H, 8.50. Found: C, 77.21; H, 8.41.

EXAMPLE 6

3β-hydroxy-17α-methyl-4-pregnen-20-one

Reduction of 17α-methylprogesterone [Heusser et al., Helv. Chem. Acta., 33, 2229 (1950)] with lithium aluminum tri-t-butoxyhydride at 0° C. as described above gave the corresponding 3β-hydroxy compound, characterized by its infrared spectrum, which showed the presence of hydroxyl and 20-ketone and the absence of Δ$^4$-3-ketone.

I claim:

1. A compound of the formula

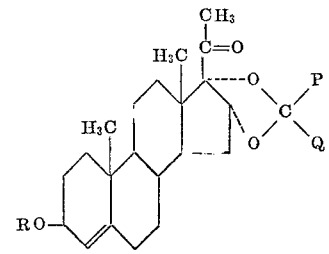

wherein R is selected from the group consisting of hydrogen and lower alkanoyl, P represents lower alkyl, and Q is selected from the group consisting of lower alkyl and phenyl.

2. 3β - hydroxy - 16α,17α - isopropylidenedioxy - 4 - pregnen-20-one.

3. 3β,16α,17α-trihydroxy-4-pregnen-20-one acetophenonide.

(References on following page)

References Cited

UNITED STATES PATENTS

| | | | |
|---|---|---|---|
| 3,008,958 | 11/1961 | Fried et al. | 260—239.55 |
| 3,061,606 | 10/1962 | Gut et al. | 260—239.55 |
| 3,126,399 | 5/1964 | Sollman | 260—397.4 |
| 3,209,000 | 9/1965 | Babcock et al. | 260—397.5 |

OTHER REFERENCES

Fieser and Fieser, Steroids, New York, Reinhold, 1959, page 561.

Fried et al., Chem. and Ind., pp. 465 and 466 (1961).

Fried et al., Chem. and Ind., pp. 466–468 (1961).

H. A. FRENCH, *Primary Examiner.*